US011421402B2

(12) United States Patent
Ries et al.

(10) Patent No.: US 11,421,402 B2
(45) Date of Patent: Aug. 23, 2022

(54) OPERATION-BASED OBJECT DETECTION FOR A WORK MACHINE

(71) Applicant: Caterpillar Paving Products Inc., Brooklyn Park, MN (US)

(72) Inventors: Michael William Ries, Andover, MN (US); David E. Munson, West Peoria, IL (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 302 days.

(21) Appl. No.: 16/782,837

(22) Filed: Feb. 5, 2020

(65) Prior Publication Data
US 2021/0238827 A1 Aug. 5, 2021

(51) Int. Cl.
| | | |
|---|---|---|
| *E02F 9/26* | (2006.01) | |
| *E02F 9/20* | (2006.01) | |
| *B60R 1/00* | (2022.01) | |
| *B60Q 9/00* | (2006.01) | |
| *E02F 9/24* | (2006.01) | |
| *B60Q 5/00* | (2006.01) | |

(52) U.S. Cl.
CPC ............... *E02F 9/26* (2013.01); *B60Q 5/006* (2013.01); *B60Q 9/008* (2013.01); *B60R 1/00* (2013.01); *E02F 9/2004* (2013.01); *E02F 9/24* (2013.01); *B60R 2300/8093* (2013.01)

(58) Field of Classification Search
CPC ... E02F 9/2004; E02F 9/24; E02F 9/26; E02F 9/261; B60W 2300/17; B60W 2540/215; B60W 2554/404; B60W 30/08; B60W 50/14; B60R 1/00; B60R 2300/8093; B60Q 5/006; B60Q 9/008
See application file for complete search history.

(56) References Cited

U.S. PATENT DOCUMENTS

| | | | |
|---|---|---|---|
| 9,096,977 B2 * | 8/2015 | Fritz | E01C 23/127 |
| 9,896,810 B2 | 2/2018 | Berning et al. | |
| 2012/0025964 A1 * | 2/2012 | Beggs | G08B 21/18 |
| | | | 340/435 |
| 2012/0232763 A1 * | 9/2012 | Mizuochi | E02F 9/264 |
| | | | 701/50 |
| 2013/0066527 A1 * | 3/2013 | Mizuochi | E02F 9/24 |
| | | | 701/50 |
| 2015/0326829 A1 * | 11/2015 | Kurihara | H04N 7/181 |
| | | | 348/148 |
| 2016/0236616 A1 * | 8/2016 | Kurihara | G01S 7/40 |

(Continued)

FOREIGN PATENT DOCUMENTS

| | | |
|---|---|---|
| CN | 208334409 U | 1/2019 |
| JP | 6267972 B2 | 1/2018 |

*Primary Examiner* — Tyler J Lee
(74) *Attorney, Agent, or Firm* — Harrity & Harrity LLP (57) ABSTRACT

A work machine control device determines an operation mode of a work machine. The operation mode indicates that a subset of a set of zones near the work machine are to be ignored for object detection alerts. The work machine control device receives, from one or more object detection sensors, an indication that an object is within a zone of the set of zones. The work machine control device may determine to not provide an alert for the object based on a determination that the zone is within the subset of the set of zones, or may provide the alert for the object based on a determination that the zone is not within the subset of the set of zones.

20 Claims, 7 Drawing Sheets

(56) References Cited

U.S. PATENT DOCUMENTS

2016/0265174 A1    9/2016  Engelmann et al.
2020/0217049 A1*  7/2020  Mizuochi ............... B60Q 5/006
2020/0277752 A1*  9/2020  Igarashi ................. E02F 9/262
2021/0174660 A1*  6/2021  Kamimura ............. G08B 21/02

* cited by examiner

OPERATION-BASED OBJECT DETECTION FOR A WORK MACHINE

TECHNICAL FIELD

The present disclosure relates generally to a work machine and, for example, to operation-based object detection for the work machine.

BACKGROUND

Work machines (e.g., wheel loaders, track type tractors, dozers, excavators, off-highway trucks, drills, conveyor systems, and/or the like) may be large, may provide limited visibility, may operate in a noisy environment, and/or may require an operator to focus in a particular direction. Because of this, and because work machines may be capable of causing damage to, or being damaged by, unseen objects, operators may receive object detection information that may be provided by one or more sensors. The object detection information may allow an operator to identify unseen hazards near the work machine.

One attempt for object detection is disclosed in U.S. Patent Application Pub. No. US 2016265174, filed by Caterpillar Paving Products Inc. on Mar. 9, 2015 ("the '174 publication"). In particular, the '174 publication discloses a control system for a cold planar that has an object detection sensor and a locating device to allow the control system to generate an electronic map of a work area and adjust operation of the cold planer. Additionally, the '174 publication discloses a warning device that may be configured to audibly and/or visually alert the operator of the cold planar to a proximity of a milling drum of the cold planar to an object.

While the control system of the '174 publication may assist an operator to locate an object, the operator may receive unnecessary alerts of objects about which the operator is already aware. The unnecessary alert may distract the operator from other, more relevant alerts.

A work machine control device of the present disclosure solves one or more of the problems set forth above and/or other problems in the art.

SUMMARY

According to some implementations, a work machine control device may include one or more memories, and one or more processors, communicatively coupled to the one or more memories, configured to: determine an operation mode of a work machine, the operation mode indicating that a subset of a set of zones near the work machine are to be ignored for object detection alerts; receive, from one or more object detection sensors, an indication that an object is within a zone of the set of zones; and perform one or more actions related to providing an alert for the object based on a determination of whether the zone is within the subset of the set of zones, the one or more actions comprising: determining to not provide the alert for the object based on a determination that the zone is within the subset of the set of zones, or providing the alert for the object based on a determination that the zone is not within the subset of the set of zones.

According to some implementations, a work machine may include one or more object detection sensors, one or more alert devices, and a work machine control device configured to: determine an operation mode of the work machine, the operation mode indicating that a subset of a set of zones near the work machine are to be ignored for object detection alerts; receive, from the one or more object detection sensors, an indication that an object is within a zone of the set of zones; and perform one or more actions related to providing an alert for the object based on a determination of whether the zone is within the subset of the set of zones, the one or more actions comprising: determining to not provide the alert for the object based on a determination that the zone is within the subset of the set of zones, or providing, via an alert device of the work machine, the alert for the object based on a determination that the zone is not within the subset of the set of zones.

According to some implementations, a method may include determining an operation mode of a work machine, the operation mode indicating that a subset of a set of zones near the work machine are to be ignored for object detection alerts; receiving an indication that an object is within a zone of the set of zones; and performing one or more actions related to providing an alert for the object based on a determination of whether the zone is within the subset of the set of zones, the one or more actions comprising: determining to not provide the alert for the object based on a determination that the zone is within the subset of the set of zones, or providing the alert for the object based on a determination that the zone is not within the subset of the set of zones.

DETAILED DESCRIPTION

Figure 1:
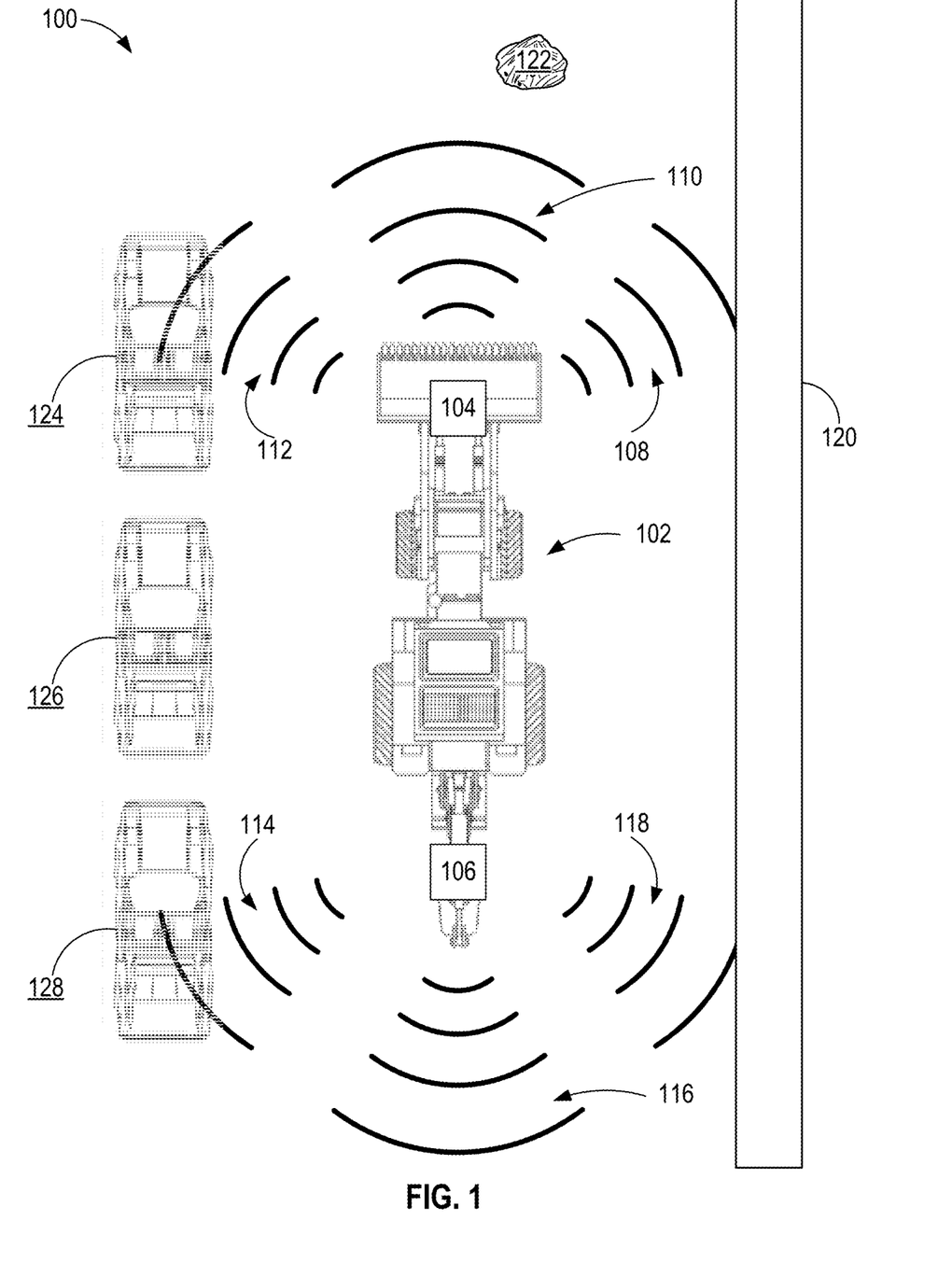
FIG. 1 is a diagram of an example environment in which systems and/or methods, described herein, may be implemented.

FIG. 1 is a diagram of an example environment 100 in which systems and/or methods described herein may be implemented. As shown in FIG. 1, a work machine 102 operates in the environment 100 with one or more objects in or near a work site. The work machine 102 may be suited for operating in an environment such as shown in the example environment 100, a mining environment, a construction environment, an earth moving environment, an agriculture environment, an off-highway environment, and/or the like. Although shown as an earth moving work machine, the work machine 102 may correspond to a compactor, a wheel loader, a track type tractor, a motor grader, a dozer, an excavator, and/or the like.

The work machine 102 includes one or more object detection sensors 104, 106. The object detection sensors 104, 106 may include one or more of an image capturing device (e.g., a camera), a radar-based sensor, an ultrasonic sensor, a lidar-based sensor, and/or the like. The object detection sensors 104, 106 are configured to capture information to indicate that an object is present, information to be used to recognize an object type of the object, a distance to, and/or a proximity of, the object and/or the like.

As shown, the object detection sensor 104 is configured to detect objects that are present within one or more zones, such as zones 108, 110, 112. The object detection sensor 106 is be configured to detect objects that are present within one or more other zones, such as zones 114, 116, 118. The object detection sensor 104 detects a barrier 120 within the zone 108. The object detection sensor 104 detects that the zone 110 is free from objects at the time shown, but may detect an object 122 within the zone 110 if the work machine 102 moved toward the object 122. The object detection sensor 104 detects a vehicle 124 within the zone 112.

Although shown in a generally triangular shape in FIG. 1, the object detection sensor 106 is be configured to detect objects that are present within any number of zones of any shape. For example, zones may be defined by threshold distances from an object detection sensor (e.g., with individual zones defined by ranges of distances from an object detection sensor). This may result in arched zones having thicknesses defined by distance ranges from an object detection sensor.

In some implementations, the work machine 102 may include sufficient coverage from object detection sensors to detect objects in all directions from the work machine 102. In some implementations, as shown in FIG. 1, the work machine 102 may not include object detection sensors to detect objects in all directions (e.g., lateral directions toward which the work machine is not configured to travel). For example, the work machine 102 may not detect a vehicle 126 that is in a lateral direction from the work machine 102.

The object detection sensor 106 detects a vehicle 128 within the zone 114, that the zone 116 is free from objects, and the barrier 120 within the zone 118.

When an operation mode is not selected, the work machine 102 provides alerts for each of the zones 108, 112, 114, 118 in which an object is detected. In this case, an operator of the work machine may receive 4 alerts or a single alert that objects are detected in the zones 108, 112, 114, 118. However, if the operator is already aware of the presence of the barrier 120 because the work machine 102 is operating along the barrier 120 for a period of time or for a distance, the alerts for the zones 108, 118 may not be alerting the operator to an unknown or unseen hazard and may be unhelpful. Additionally, the alerts for the zones 108, 118 may distract the operator from alerts relating to unknown or unseen objects (or alerts relating to objects having an increased likelihood of being unknown or unseen).

As indicated above, FIG. 1 is provided as an example. Other examples may differ from what is described in connection with FIG. 1.

Figure 2:
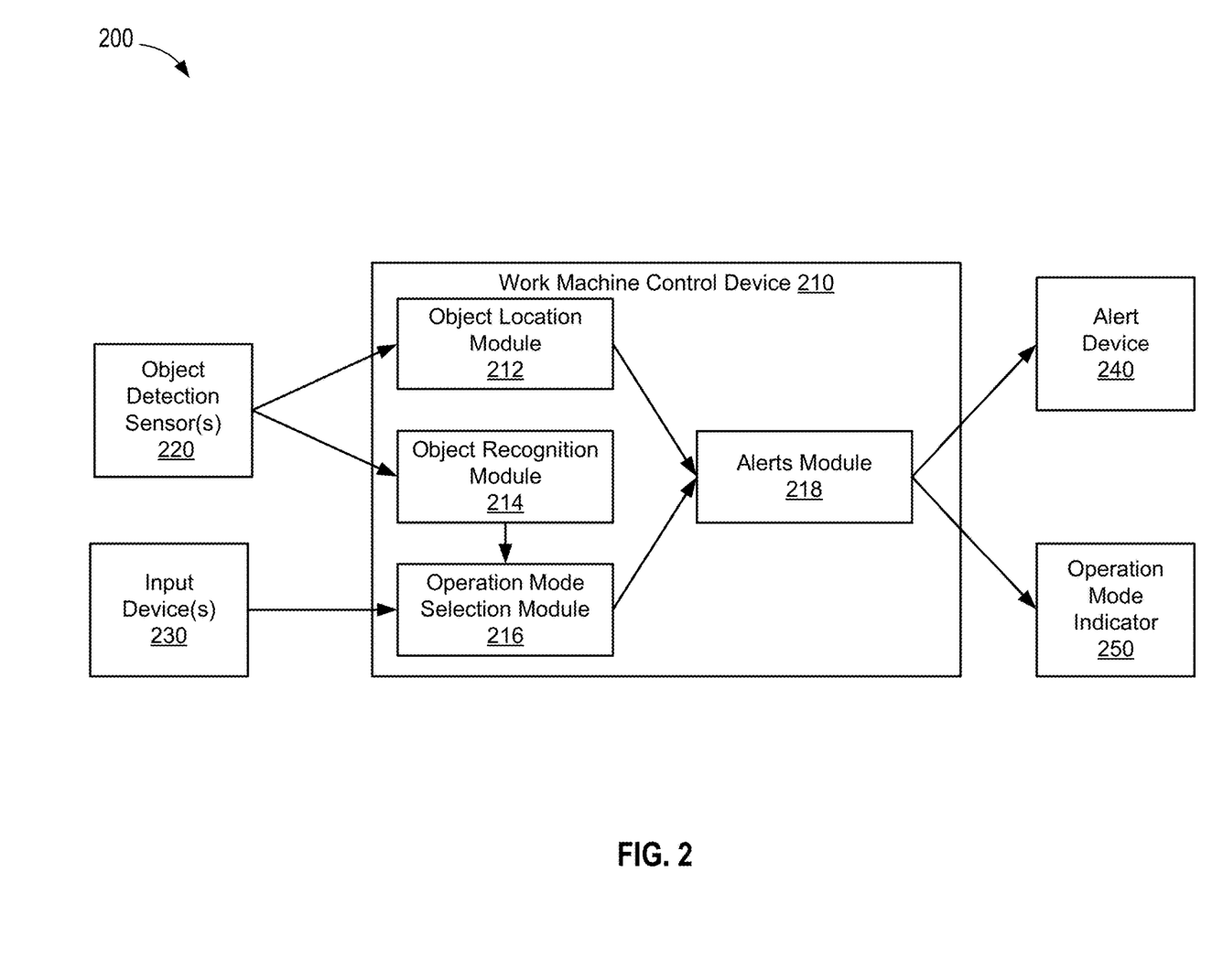
FIG. 2 is diagram of an example implementation of operation-based object detection for a work machine, as described herein.

FIG. 2 is diagram of an example implementation 200 of operation-based object detection for a work machine, as described herein. As shown in FIG. 2, a work machine control device 210 includes an object location module 212, an object recognition module 214, an operation mode selection module 216, and/or an alerts module 218. The work machine control device 210 is configured to receive information that indicates that an object is detected by one or more object detection sensors 220 and a location of the object (e.g., a zone in which the object is detected). The object location module 212 may be configured to operate on the information before providing the received information to the alerts module 218. For example, the object location module 212 may be configured to remove redundant information caused by multiple object detection sensors 220 providing information identifying the same object.

The object recognition module 214 is configured to receive parameters of a detected object from the one or more object detection sensors 220. For example, the parameters include image data that capture the detected object, measurements of the object, colors of the detected object, information that can be used to derive additional information, and/or the like. The object recognition module 214 may use the parameters to identify an object type of the detected object. In some implementations, the object recognition module 214 may compare the parameters with parameters associated with one or more known objects. In some implementations, the object recognition module 214 may compare the parameters with one or more thresholds to determine an object type of the object. For example, the object recognition module 214 may determine that an object is a barrier that borders an operating space of the work machine 102 (e.g., a wall, a traffic barrier, a cliff, and/or the like) based on the parameters indicating that the object is at least 20 feet long and relatively straight.

The operation mode selection module 216 may be configured to determine an operation mode of the work machine. In some implementations, the operation mode selection module 216 receives operator input from one or more input devices 230. The operator input may provide a selection of an operation mode. The one or more input devices 230 may include a control panel, a touchscreen display, a microphone, a keyboard, a mouse, a mechanical button, a capacitive button, and/or another device configured to receive input from an operator.

In some implementations, the operation mode selection module 216 may be configured to determine the operation mode based on one or more indications from the object recognition module 214. For example, if the object recognition module 214 indicates that a barrier is to the right of the work machine 102, the operation mode selection module 216 may determine that the work machine 102 is performing an operation that includes traversing a work site with the barrier to the right. In some implementations, operation selection module 216 may identify a distance (e.g., from one of the object detection sensors 104, 106) to the barrier. The operation mode selection module 216 may select the operation mode of the work machine 102 based on the one or more indications from the object recognition module 214 (e.g., without input from the operator). In some implementations, the operation mode selection module 216 may provide an indication of one or more proposed operation modes, based on the one or more indications from the object recognition module 214, to an output device for selection by the operator. The operation mode selection module 216 may determine the operation mode based on a response from the operator.

The alerts module 218 is configured to receive an indication of the operation mode of the work machine 102 from the operation mode selection module 216. The alerts module 218 may use the operation mode to determine to not provide alerts for objects detected within zones that are within a subset of zones (e.g., a subset of the set of all zones detectable by the one or more object detection sensors 220) to be ignored for object detection alerts (e.g., as defined in the operation mode).

In some implementations, the alerts module 218 may use the operation mode to determine to not provide alerts detected within one or more portions of the zones that are within the subset of zones. For example, the one or more portions may be predefined portions having predefined shapes, may be based on distances from the one or more object detection sensors 220, may be based on distances from a component of the work machine 102, may be based on angular portions of associated zones, and/or the like. For example, the alerts module 218 may selectively provide alerts for objects detected within the subset of zones based on whether the objects satisfy a threshold distance from the one or more object detection sensors 220, a component of the work machine 102, and/or the like.

In some examples, the alerts module 218 may selectively provide alerts for objects detected within the subset of zones based on whether the objects satisfy a threshold angle (e.g., from the one or more object detection sensors 220, a component of the work machine 102, and/or the like). The threshold angle may define one or more portions of a zone to identify objects to the right, in front of, or to the left of the work machine 102. The threshold angle may be further defined to identify a degree to the left or a degree to the right that is a cutoff angle for providing alerts (e.g., indicating to only provide alerts if an object is detected to the right or to the left of the threshold angle). In some implementations, alerts module 218 may selectively provide alerts for objects detected within one or more portions of the subset of zones based on whether the objects satisfy two or more threshold angles (e.g., between a first threshold angle and a second threshold angle).

The alerts module 218 may be configured to provide one or more alerts, for presentation to an operator, for objects that are determined to be in zones that are not within the subset of zones (e.g., within one or more portions of the subset of zones) to be ignored for object detection alerts. For example, the alerts module 218 may provide an alert to an alert device 240 for presentation to the operator. The alert device 240 may include a display, a speaker, a haptic device, and/or another device configured to provide information to the operator.

Additionally, the alerts module 218 may be configured to provide an indication of the operation mode to an operation mode indicator 250 for presentation to the operator. The operation mode indicator 250 may include a display, a speaker, a haptic device, and/or another device configured to present the indication of the operation mode to the operator. For example, the operation mode indicator 250 may include a light indicator (e.g., a light emitting diode) adjacent to an indicator of the operation mode to indicate that the operation mode is active.

One or more of the alert device 240, the operation mode indicator 250, and the one or more input devices 230 may be comprised in a single device (e.g., a computing device, a display, a touchscreen display, an operator interface, and/or the like).

As indicated above, FIG. 2 is provided as an example. Other examples may differ from what is described in connection with FIG. 2.

Figure 3:
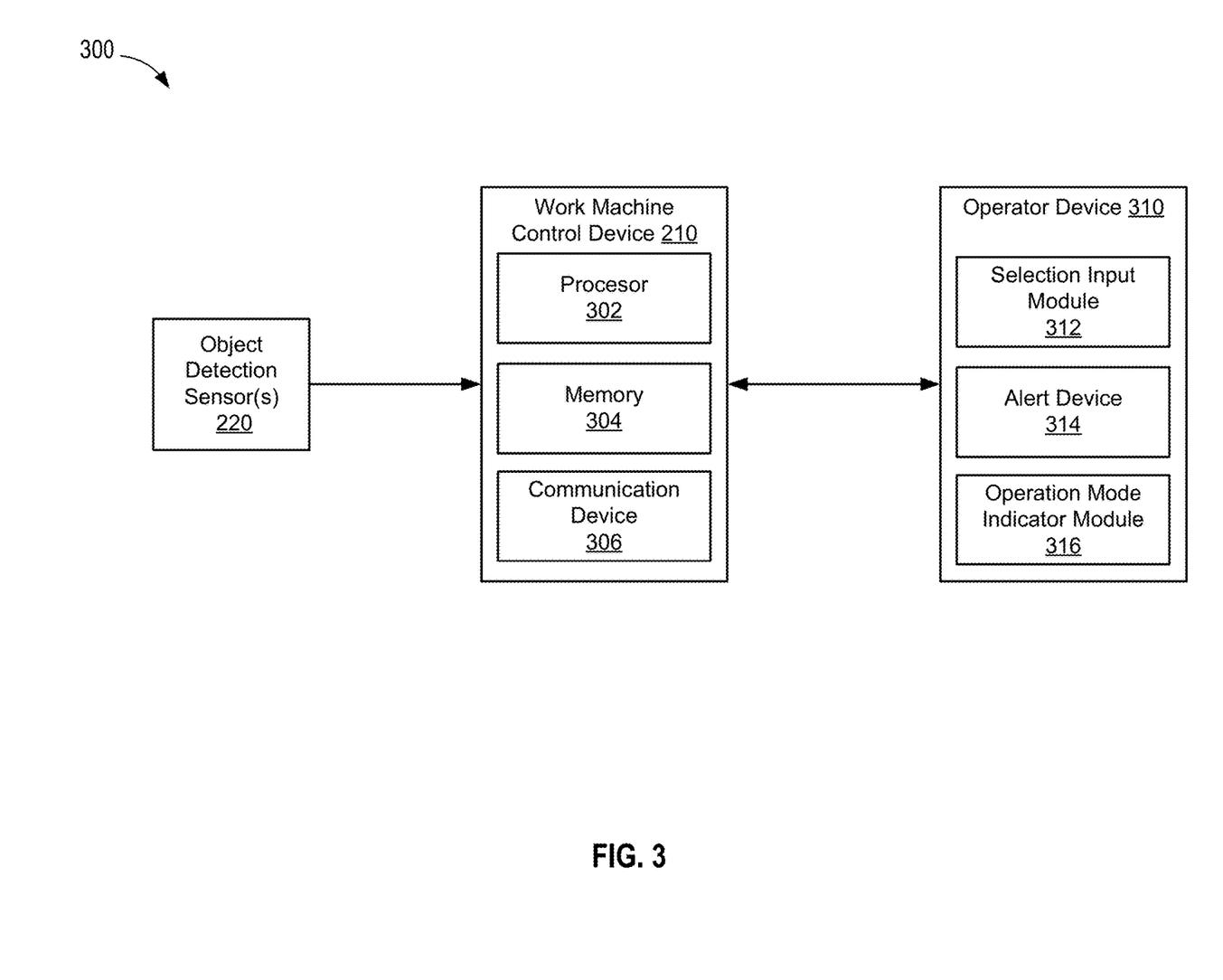
FIG. 3 is an example implementation of operation-based object detection for a work machine, as described herein.

FIG. 3 is an example implementation 300 of operation-based object detection for a work machine, as described herein. As shown in FIG. 3, the work machine control device 210 may include a processor 302, a memory 304, and a communication device 306. Processor 302 is implemented in hardware, firmware, and/or a combination of hardware and software capable of being programmed to perform a function associated with operation-based object detection for the work machine 102. Memory 304 includes a random-access memory (RAM), a read only memory (ROM), and/or another type of dynamic or static storage device that stores information and/or instructions to be performed by processor 302. Communication device 306 includes a local area network (LAN) component (e.g., an Ethernet component), a wireless local area network (WLAN) component (e.g., a Wi-Fi component), a radio frequency (RF) communication component (e.g., a Bluetooth component), a positioning component (e.g., a global positioning system (GPS) component, a global navigation satellite system (GNSS) component), and/or the like. Communication device 306 may enable processor 302 to exchange indications of detected objects, operator input, alerts, operation modes, and/or other information relating to an operating mode, alerts, and/or the like with the one or more object detection sensors 220, the operator device 310, and/or the like.

The operator device 310 includes a selection input module 312, an alert device 314 (e.g., an audio output device, a display device, an indicator light, a haptic device, and/or the like), an operation mode indicator module 316, and/or the like. The selection input module 312, the alert device 314, the operation mode indicator module 316, and/or the like may be implemented using one or more of a processor, a memory, and/or a communication device of the operator device. The operator device may comprise the one or more input devices 230, the alert device 240, and/or the operation mode indicator 250.

As shown, the work machine control device 210 is configured to receive information from the one or more object detection sensors 220 (e.g., an indication of a detected object, parameters of the detected object, a location of the detected object, and/or the like). The work machine control device 210 is also configured to provide and/or receive information from the operator device 310.

The work machine control device 210 may be configured to identify an object type and a location of an object (e.g., a zone in which the object is located) and determine a proposed operation mode based on a definition of the operation mode as including the object type of the object. The work machine control device 210 may provide an indication of the proposed operation to the operator device 310 for presentation (e.g., for visual display and/or audible presentation to the operator). The operator device 310 may present the indication of the proposed operation via a display (e.g., a touchscreen), a light indicator, a speaker, and/or another output device configured to provide information to the operator. For example, the selection input module 312 may cause the indication to be displayed for the operator.

The operator device 310 is configured to receive input from the operator to select or reject the proposed operation mode, select the proposed operation mode from a set of proposed and/or candidate operation modes (e.g., with or without receiving an indication of the proposed operation), and/or the like. For example, the operator device 310 may receive the input from the operator via the selection input module 312.

The operator device 310 is configured to provide the work machine control device 210 with the selection of the proposed and/or candidate operation mode. The work machine control device 210 uses the selection of the operation mode to filter information received from the one or more object detection sensors 220. The work machine control device 210 is configured to use the operation mode to determine whether to not provide an alert for a detected object or to provide the alert to the operator device 310 for presentation via the alert device 314.

The work machine control device 210 may also be configured to provide an indication of the operation mode to the operator device 310 for presentation via the operation mode indicator module 316.

The work machine control device 210 may be configured to provide, for display via a display device of the operator device, an indication of the object even if the work machine control device 210 has determined to not provide an alert associated with the object. For example, the work machine control device 210 may provide the indication for display at a location on a map and not provide an alert based on the location on the map being within the subset of zones, or within one or more portions of the subset of zones, to be ignored for object detection alerts.

The work machine control device may be configured to provide, after a period of time (e.g., periodically) or based on an event (e.g., moving away from a barrier, restarting the work machine 102, and/or the like), a request to confirm the operation mode.

As indicated above, FIG. 3 is provided as an example. Other examples may differ from what is described in connection with FIG. 3. As used herein, the term "module" is intended to be broadly construed as hardware, firmware, or a combination of hardware and software.

Figure 4A:
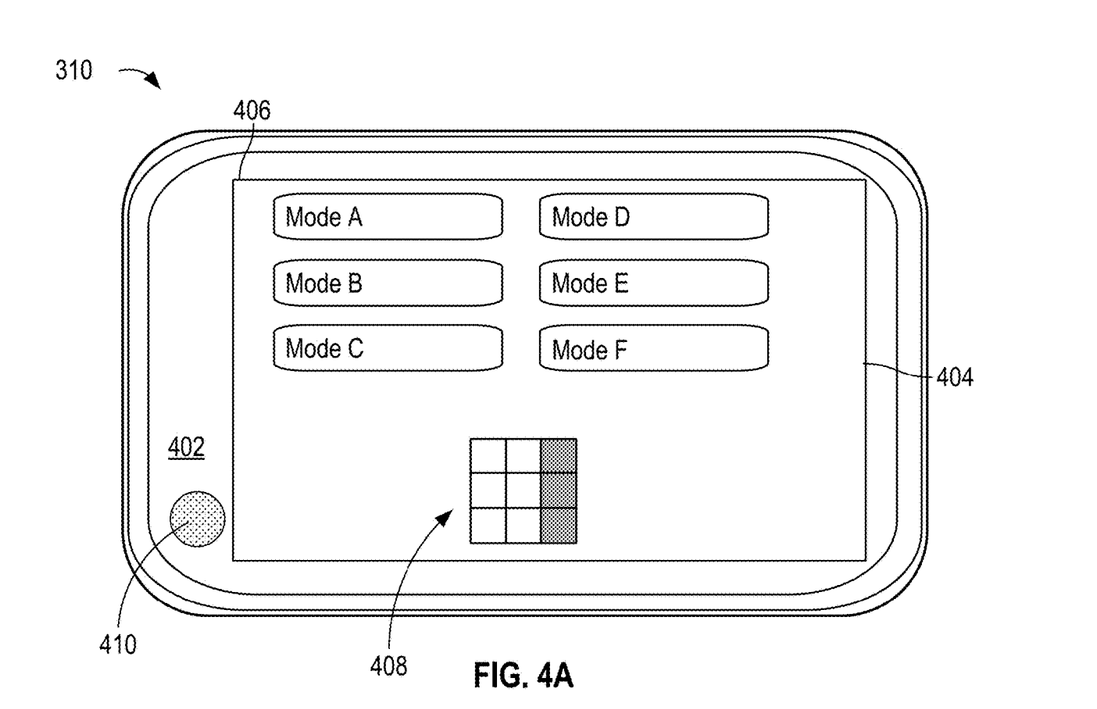
FIGS. 4A and 4B are diagrams of example implementations of a display device of a work machine, as described herein.

FIGS. 4A and 4B are diagrams of example implementations of an operator device 310 of a work machine 102, as described herein. As shown in FIG. 4A, the operator device 310 includes a user interface 402 that includes a display 404. The display 404 shows a menu 406 of proposed and/or candidate operation modes for selection by an operator. The display 404 may provide a preview 408 to indicate one or more zones to be ignored for object detection based on a currently selected operation mode, a proposed operation mode, and/or based on input requesting a preview of the one or more zones to be ignored for object detection. For example, the preview 408 indicates that the zones to the right of the work machine 102 are to be ignored based on the selection of a particular operation mode. The preview 408 may show the zones using a grid of zones and/or subzones that may be rectangular (e.g., including squares), curved, conical, triangular, and/or the like. The preview 408 may show multiple zones for multiple object detection sensors 220 (e.g., one or more front object detection sensors, one or more side object detection sensors, one or more back object detection sensors, and/or the like).

The display 404 may include a touchscreen configured to receive input from the operator by receiving a touch on the menu 406 from the operator. Additionally, or alternatively, the user interface 402 may include one or more other input interfaces (e.g., buttons) and/or devices for receiving input from an operator.

Figure 4B:
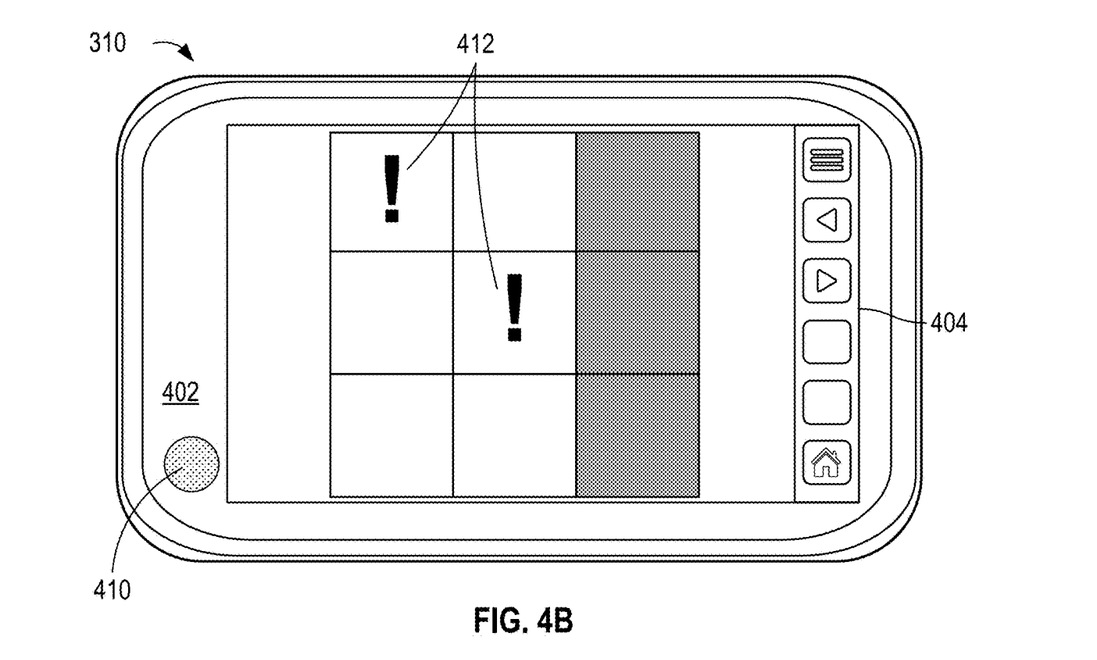

The display 404 and/or a speaker 410 comprise one or more alert devices (e.g., the alert device 240 and/or the alert device 314) and/or an operation mode indicator (e.g., the operation mode indicator 250 and/or the operation mode indicator module 316). As shown in FIG. 4B, the display 404 may provide alerts 412 for presentation to the operator based on a selected operation mode.

The number and arrangement of devices shown in FIGS. 1-4B are provided as examples. In practice, there may be additional devices and/or modules, fewer devices and/or modules, different devices and/or modules, or differently arranged devices and/or modules than those shown in FIGS. 1-4B. Furthermore, two or more devices shown in FIGS. 1-4B may be implemented within a single device, or a single device shown in FIGS. 1-4B may be implemented as multiple, distributed devices. Additionally, or alternatively, a set of devices (e.g., one or more devices) of FIGS. 1-4B may perform one or more functions described as being performed by another set of devices and/or modules of FIGS. 1-4B.

Figure 5:
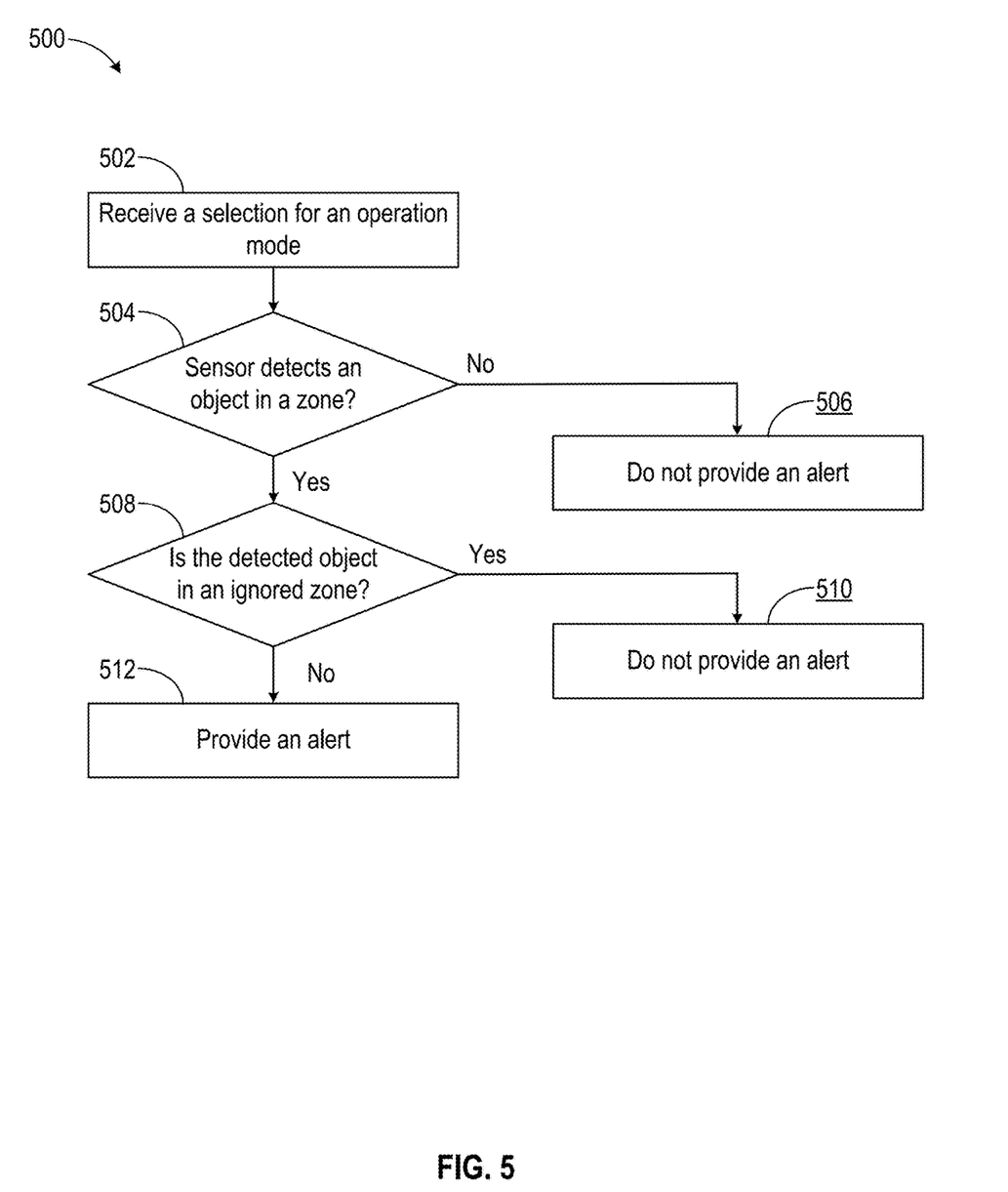
FIG. 5 is a flow chart of an example process for operation-based object detection for a work machine.

FIG. 5 is a flow chart of an example process 500 for operation-based object detection for a work machine. In some implementations, one or more process blocks of FIG. 5 are performed by a work machine control device (e.g., work machine control device 210). In some implementations, one or more process blocks of FIG. 5 may be performed by another device or a group of devices separate from or including the work machine control device, such as an object detection sensor (e.g., object detection sensor(s) 220), an input device (e.g., input device 230), an alert device (e.g., alert device 240), an operation mode indicator (operation mode indicator 250), an operator device (e.g., operator device 310), and/or the like.

As shown in FIG. 5, process 500 may include determining an operation mode of a work machine by receiving a selection for the operation mode (block 502). For example, the work machine control device determines an operation mode of the work machine by receiving a selection for the operation mode. The operation mode indicates that a subset of a set of zones near the work machine, or one or more portions of the subset of zones, are to be ignored for object detection alerts, as described above.

As further shown in FIG. 5, process 500 may include determining whether an object detection sensor detects an object in a zone (block 504). For example, the work machine control device may receive, from one or more object detection sensors, an indication that an object is within a zone of a set of zones detectable by the one or more object detection sensors, as described above. If the work machine control device does receive an indication that an object is detected within the zone, the work machine control device does not provide an alert (block 506)

As further shown in FIG. 5, process 500 may include, if the object detection sensor detects an object in the zone, determining if the detected object is within an ignored zone based on the operation mode (block 508). If the zone is within a zone of the subset of zones, or within one or more portions of the subset of zones, to be ignored, the work machine control device may determine to not provide an alert (block 510). If the zone is not within the subset of zones, or within one or more portions of the subset of zones, to be ignored, the work machine may provide the alert, as described above (block 512).

Process 500 may include additional implementations, such as any single implementation or any combination of implementations described herein. Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
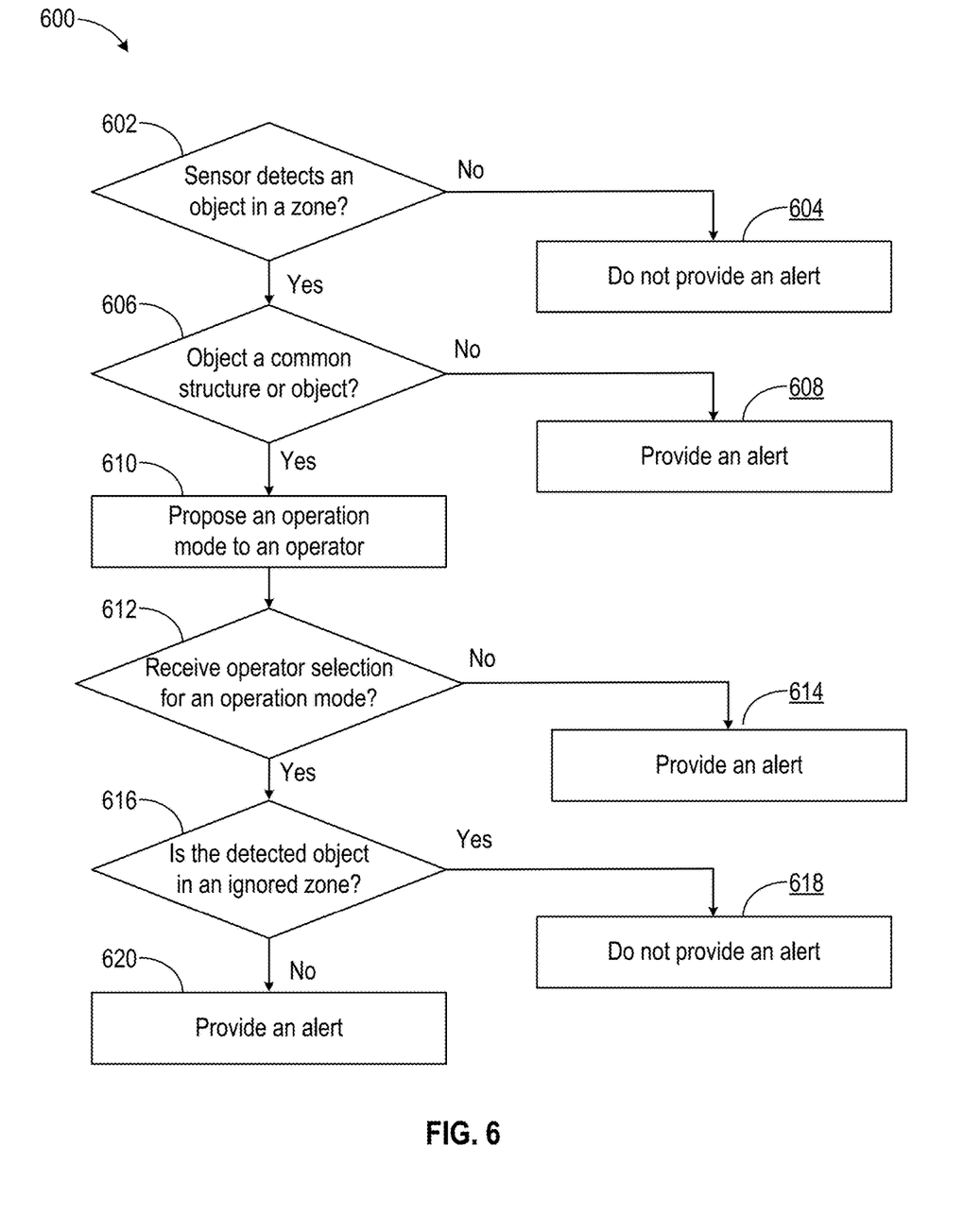
FIG. 6 is a flow chart of an example process for operation-based object detection for a work machine.

FIG. 6 is a flow chart of an example process 600 for operation-based object detection for a work machine. In some implementations, one or more process blocks of FIG. 6 may be performed by a work machine control device (e.g., work machine control device 210). In some implementations, one or more process blocks of FIG. 6 may be performed by another device or a group of devices separate from or including the work machine control device, such as an object detection sensor (e.g., object detection sensor(s) 220), an input device (e.g., input device 230), an alert device (e.g., alert device 240), an operation mode indicator (operation mode indicator 250), an operator device (e.g., operator device 310), and/or the like.

As shown in FIG. 6, process 600 includes determining whether an object detection sensor detects objects in a zone (block 602). If the sensor does not detect an object in the zone, the work machine control device does not provide an alert (block 604).

If the object detection sensor detects the object in the zone, the work machine control device determines whether the object is a common structure or object (block 606). For example, the work machine control device may use the object recognition module 214 to determine whether the object is a common structure or object, such as a wall or other barrier. If the object is not a common structure or object, the work machine control device provides an alert (block 608). If the object is a common structure or object, process 600 may include proposing an operation mode to a user (block 610).

Process 600 may include determining whether the work machine control device receives an operator selection for an operation mode (block 612). For example, work machine control device may receive a selection of a proposed and/or candidate operation mode via the operator device 310. If the work machine control device does not receive the operator selection, the work machine control device provides an alert (block 614).

Process 600 may include, if the work machine control device receives a user selection for an operation mode, determining if the detected object is in an ignored zone (block 616). If the detected object is in an ignored zone, the work machine control device determines to not provide an alert (block 618). If the detected object is not in an ignored zone, the work machine control device provides an alert (block 620).

Process 600 may include additional implementations, such as any single implementation or any combination of implementations described herein. Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7:
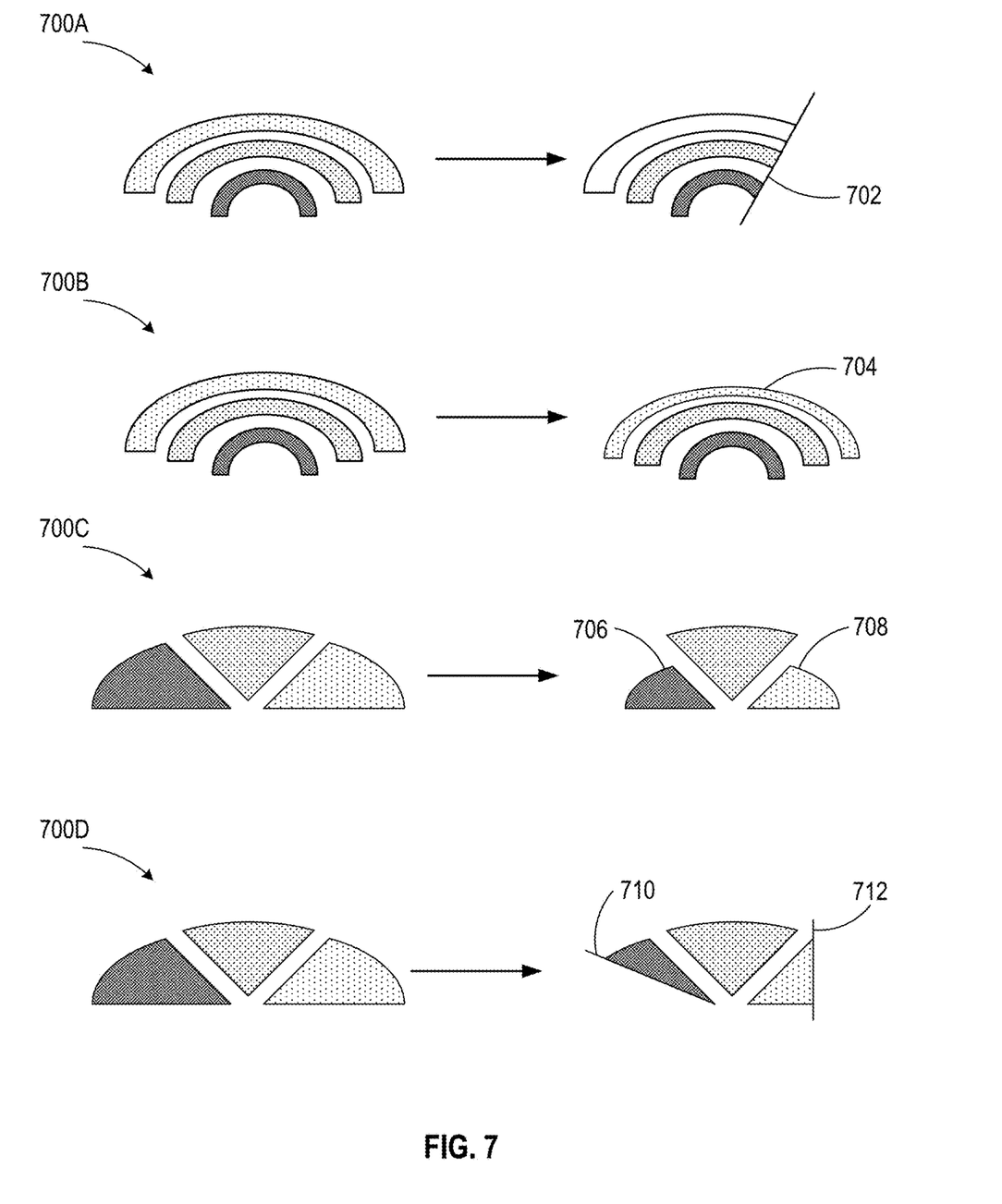
FIG. 7 is a diagram of examples of zones for operation-based object detection for a work machine, as described herein.

FIG. 7 is a diagram of examples 700A, 700B, 700C, 700D of zones for operation-based object detection for a work machine, as described herein. Although shown at having 3 zones in the examples 700A, 700B, 700C, 700D, object detection sensors (e.g., object detection sensor(s) 220) may be configured with more than three or fewer than three zones for object detection. As shown in examples 700A, 700B, the zones may be configured based on distance ranges from one or more object detection sensors. As shown in examples 700C, 700D, the zones may be configured based on angle ranges from one or more object detection sensors.

As shown in example 700A, an alerts module (e.g., the alerts module 218) may be configured to selectively provide alerts (e.g., based on an operation mode of an associated work machine (e.g., work machine 102)) for objects detected within the zones (e.g., a proper subset of zones or a full set of zones) based on whether the objects satisfy a threshold angle illustrated by a line at reference number 702. In other words, the alerts module may be configured to selectively provide alerts for objects detected within the zones based on the objects being at an angle that is counter-clockwise from the threshold angle. The alerts module and/or one or more object detection sensors may be configured to ignore, or filter out, detections of objects that do not satisfy the threshold angle. In some implementations, the alerts module may be configured to selectively provide alerts for objects detected within the zones based on whether the objects satisfy a plurality of threshold angles (e.g., if a detected object is between two threshold angles).

As shown in example 700B, an alerts module may be configured to selectively provide alerts for objects detected within the zones based on whether the objects satisfy a threshold distance (e.g., from one or more object detection sensors) illustrated by a curved line at reference number 704. In other words, the alerts module may be configured to selectively provide alerts for objects detected within the zones based on the objects being at a distance that is less than the threshold distance (e.g., within a maximum distance) or that is more than the threshold distance (e.g., outside of a minimum distance). In some implementations, the alerts module and/or one or more object detection sensors may be configured to ignore, or filter out, detections of objects that do not satisfy the threshold distance.

As shown in example 700C, an alerts module may be configured to selectively provide alerts for objects detected within the zones based on whether the objects satisfy one or more threshold distances (e.g., from one or more object detection sensors) illustrated by curved lines at reference numbers 706, 708. In other words, the alerts module may be configured to selectively provide alerts for objects detected within the zones based on the objects being at a distance that is less than the one or more threshold distances of a zone in which the object is detected. In some implementations, the alerts module and/or one or more object detection sensors may be configured to ignore, or filter out, detections of objects that do not satisfy the threshold distance.

As shown in example 700D, an alerts module may be configured to selectively provide alerts for objects detected within the zones based on whether the objects are within one or more portions of the zones (e.g., a predefined shape based on a threshold angle, a threshold distance from one or more object detection sensors, a threshold lateral distance from the associated work machine and/or object detection sensor, and/or the like). For example, one of the portions is define by a threshold angle illustrated by a line at reference number 710. Another portion is defined by a lateral distance from the associated work machine and/or object detection sensor illustrated by a line at reference number 712. In other words, the alerts module may be configured to selectively provide alerts for objects detected within the portions of the zones. The alerts module and/or one or more object detection sensors may be configured to ignore, or filter out, detections of objects that are without the portions of the zones.

As indicated above, FIG. 7 is provided as examples. Other examples may differ from what is described in connection with FIG. 7.

INDUSTRIAL APPLICABILITY

An operator of a work machine may have difficulty observing objects that are near the work machine. For example, the work machine may have an excavator arm or a bucket that obstructs the vision of the operator. Additionally, work machines and worksites may be loud, which can make it difficult to hear objects or warnings at the work site. Because work machines may be heavy, powerful machines, a work machine may cause damage and/or receive damage from collisions with objects at the work site. For these reasons, work machines may be equipped with an alert system that detects objects near the work machine and provides related alerts.

However, when an operator of the work machine causes the work machine to travel along a known barrier (e.g., a wall, a road barrier, traffic cones, and/or the like) the work machine may provide a constant, or nearly constant, alert for the known barrier. Additionally, if the work machine operates in a lane of a road and objects are in another lane of the road (e.g., workers, vehicles, and/or the like), the work machine may provide alerts for objects that do not interfere with the operation of the work machine within the lane of the road. These alerts may be unnecessary and may distract the operator from relevant alerts related to objects that may interfere with the operation of the work machine.

As described herein, a work machine controller may determine an operation mode of the work machine to be used for filtering out unnecessary alerts. For example, the work machine controller may receive (e.g., from an operator device) an operator input to select an operation mode of the work machine. The operation mode may indicate that a subset of zones, or one or more portions of the subset of zones, of a set of zones near the worksite are to be ignored for object detection alerts. For example, the operator may provide input to select a single lane operation mode that indicates that zones outside of the lane of traffic (e.g., back left, left, front left, front right, right, and back right zones) should be ignored. When the work machine control device receives an indication that an object is detected near the work machine, the work machine control device may determine whether an alert is to be provided based on whether the object is detected within an ignored zone.

By ignoring some detected objects based on an operation mode, the work machine control device may reduce a quantity of unhelpful alerts that are provided to the operator, which may improve safety for operating the vehicle, reduce damage to the work machine caused by collisions with unknown or unseen objects, facilitate an efficient alert system that reduces confusion from excess alerts, and/or the like.

What is claimed is:

1. A work machine control device, comprising:
   one or more memories; and
   one or more processors, communicatively coupled to the one or more memories, configured to:
   determine an operation mode of a work machine,
      the operation mode indicating that a subset of a set of zones near the work machine are to be ignored for object detection alerts;
   receive, from one or more object detection sensors, an indication that an object is within a zone of the set of zones;
   determine whether the zone is within the subset of the set of zones to be ignored; and
   perform one or more actions related to providing an alert for the object based on whether the zone is within the subset of the set of zones to be ignored, the one or more actions comprising:
      determining to not provide the alert for the object when the zone is within the subset of the set of zones to be ignored, or
      providing using an alert device for presentation, the alert for the object when the zone is not within the subset of the set of zones to be ignored.

2. The work machine control device of claim 1, wherein the one or more processors are further configured to:
   determine the operation mode by receiving operator input, from an input device, to select the operation mode of the work machine.

3. The work machine control device of claim 1, wherein the one or more processors are further configured to:
   determine the operation mode by:
      receiving, from the one or more object detection sensors, parameters of an additional object within one or more zones of the set of zones;
      identifying, based on the parameters, an object type and a location of the additional object; and
      determining the operation mode based on a definition of the operation mode as including the object type of the additional object in the location.

4. The work machine control device of claim 1, wherein the one or more processors are further configured to:
   determine the operation mode by:
      receiving, from the one or more object detection sensors, parameters of an additional object within one or more zones of the set of zones;
      identifying, based on the parameters, an object type and a location of the additional object;
      determining a proposed operation mode based on a definition of the operation mode as including the object type of the additional object in the location;
      providing an indication of the proposed operation mode to an output device; and
      receiving a selection of the proposed operation mode via an input device.

5. The work machine control device of claim 4, wherein the object type comprises a barrier that borders an operating space of the work machine.

6. The work machine control device of claim 1, wherein the one or more processors are further configured to:
   provide an indication of the operation mode to an output device for indicating the operation mode to an operator.

7. The work machine control device of claim 1, wherein, when the zone is within the subset of the set of zones to be ignored, the one or more actions comprise:
   determining to not provide the alert for the object; and
   providing, for display via a display device, an indication of the object within the zone.

8. A work machine comprising:
   one or more object detection sensors;
   one or more alert devices; and
   a work machine control device configured to:
      determine an operation mode of the work machine,
         the operation mode indicating that a subset of a set of zones near the work machine are to be ignored for object detection alerts;
      receive, from the one or more object detection sensors, an indication that an object is within a zone of the set of zones;
      determine that the zone is within the subset of the set of zones to be ignored; and
      determine to not provide an alert for the object based on determining that the zone is within the subset of the set of zones to be ignored.

9. The work machine of claim 8, wherein the one or more object detection sensors comprise at least one of:
   an image capturing device;
   a radar-based sensor;
   an ultrasonic sensor; or
   a lidar-based sensor.

10. The work machine of claim 8, wherein the one or more alert devices comprise one or more of:
    an audio output device;
    a display device;
    a haptic device; or
    an indicator light.

11. The work machine of claim 8, further comprising an operation mode indicator, wherein the operation mode indicator is configured to provide an indication of the operation mode of the work machine.

12. The work machine of claim 8, wherein the work machine further comprises a display device,
wherein the work machine control device is further configured to:
provide, for selection by an operator input, a menu of candidate operation modes, and
determine the operation mode by receiving operator input, from an input device, to select the operation mode from the menu of candidate operation modes.

13. The work machine of claim 8, wherein the work machine control device is further configured to:
determine the operation mode by:
receiving, from the one or more object detection sensors, parameters of an additional object within one or more zones of the set of zones;
identifying, based on the parameters, an object type and a location of the additional object;
determining a proposed operation mode based on a definition of the operation mode as including the object type of the additional object in the location;
providing an indication of the proposed operation mode to an output device; and
receiving a selection of the proposed operation mode via an input device.

14. The work machine of claim 13, wherein one or more of the output device and the input device are comprised in a touchscreen display of the work machine.

15. A method, comprising:
determining an operation mode of a work machine,
the operation mode indicating that a subset of a set of zones near the work machine are to be ignored for object detection alerts;
receiving an indication that an object is within a zone of the set of zones;
determining whether the zone is within the subset of the set of zones to be ignored; and
determining to not provide an alert for the object based on a determination that the zone is within the subset of the set of zones to be ignored.

16. The method of claim 15, wherein determining the operation mode comprises:
receiving operator input, from an input device, to select the operation mode of the work machine.

17. The method of claim 15, wherein determining the operation mode comprises:
receiving, from one or more object detection sensors, parameters of an additional object within one or more zones of the set of zones;
identifying, based on the parameters, an object type and a location of the additional object;
determining a proposed operation mode based on a definition of the operation mode as including the object type of the additional object in the location;
providing an indication of the proposed operation mode to an output device; and
receiving a selection of the proposed operation mode via an input device.

18. The method of claim 15, wherein receiving the indication that the object is within the zone of the set of zones comprises:
receiving the indication via one or more object detection sensors that comprise one or more of:
an image capturing device;
a radar-based sensor;
an ultrasonic sensor; or
a lidar-based sensor.

19. The method of claim 15, further comprising:
providing, to an operation mode indicator, an indication of the operation mode of the work machine.

20. The method of claim 15, further comprising providing, after a period of time, a request to confirm the operation mode.

* * * * *